US012606038B2

(12) United States Patent
Gudapati et al.

(10) Patent No.: US 12,606,038 B2
(45) Date of Patent: Apr. 21, 2026

(54) MULTI-ENERGY PORTABLE POWER PANEL FOR VEHICLE

(71) Applicant: FCA US LLC, Auburn Hills, MI (US)

(72) Inventors: Abhilash Gudapati, Troy, MI (US); Abhilash Valson, Farmington Hills, MI (US)

(73) Assignee: FCA US LLC Q, Auburn Hills, MI (US)

( * ) Notice: Subject to any disclaimer, the term of this patent is extended or adjusted under 35 U.S.C. 154(b) by 642 days.

(21) Appl. No.: 18/178,603

(22) Filed: Mar. 6, 2023

(65) Prior Publication Data

US 2024/0300346 A1     Sep. 12, 2024

(51) Int. Cl.
B60L 53/22      (2019.01)
B60L 53/16      (2019.01)
B60L 53/51      (2019.01)
B60L 58/20      (2019.01)

(52) U.S. Cl.
CPC .............. B60L 53/22 (2019.02); B60L 53/16 (2019.02); B60L 53/51 (2019.02); B60L 58/20 (2019.02); *B60L 2210/10* (2013.01); *B60L 2210/40* (2013.01)

(58) Field of Classification Search
USPC ........................................................ 320/103
See application file for complete search history.

(56) References Cited

U.S. PATENT DOCUMENTS

| | | | | |
|---|---|---|---|---|
| 2011/0007491 A1* | 1/2011 | Robinson | .................. | H02J 5/00 |
| | | | | 361/810 |
| 2024/0300346 A1* | 9/2024 | Gudapati | ................ | B60L 53/22 |

FOREIGN PATENT DOCUMENTS

| | | | | | |
|---|---|---|---|---|---|
| JP | 2014217214 A | * | 11/2014 | ............ | B60L 53/126 |
| KR | 20140083904 A | * | 7/2014 | ............ | H01M 10/44 |

* cited by examiner

*Primary Examiner* — Mohammed Alam
(74) *Attorney, Agent, or Firm* — Jeremy J. Klobucar

(57)     ABSTRACT

A portable power panel includes a case having a first electrical connector extending therefrom. The case includes a first DC to DC convertor that converts a first DC voltage provided by a high voltage battery on the vehicle to a second DC voltage. The case includes a battery that produces the second DC voltage. An inverter inverts the second DC voltage into a third voltage useable as an alternating current. An alternating current plug supplies the third voltage to an accessory plugged into the alternating current plug. The case is configured to be selectively and alternatively moved between a (i) coupled position wherein the first electrical connector is electrically coupled to a complementary second electrical connector provided at a dock in the vehicle, and a (ii) decoupled position wherein the first and second electrical connectors are disconnected and the case is moveable providing portable power away from the vehicle.

19 Claims, 4 Drawing Sheets

MULTI-ENERGY PORTABLE POWER PANEL FOR VEHICLE

FIELD

The present application relates generally to portable power supplies and, more particularly, to a portable power panel configured on a vehicle.

BACKGROUND

A battery electric vehicle (BEV) includes at least one battery system and at least one electric motor. Typically, the BEV could include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. In examples, the low voltage battery system is utilized to power low voltage components of the vehicle. Some BEV's allow for auxiliary devices to be plugged in, such as during electrical power outages or other circumstances where electrical power is unavailable. In these scenarios, the vehicle is typically required to be nearby for the user to connect such devices into the vehicle battery supply at electrical connections provided on the vehicle. Accordingly, while such conventional vehicle connections do work well for their intended purpose, there exists an opportunity for improvement in the relevant art.

SUMMARY

In accordance with one example aspect of the invention, a portable power panel is provided. In one exemplary implementation, the portable power panel includes a case having a first electrical connector extending therefrom. The case includes a first DC to DC convertor that converts a first DC voltage provided by a high voltage battery on the vehicle to a second DC voltage. The case includes a battery that produces the second DC voltage. An inverter inverts the second DC voltage into a third voltage as an alternating current. An alternating current plug is configured to supply the third voltage to an accessory plugged into the alternating current plug. The case is configured to be selectively and alternatively moved between a (i) coupled position wherein the first electrical connector is electrically coupled to a complementary second electrical connector provided at a dock in the vehicle, and a (ii) decoupled position wherein the first and second electrical connectors are disconnected and the case is moveable providing portable power away from the vehicle.

In addition to the foregoing, the case further comprises a universal serial bus (USB) panel powered by the battery. The portable power panel can further include a power supply and monitoring unit that monitors operating parameters of the battery. A controller receives operating parameters from the battery. A transceiver is configured to wirelessly communicate operating parameters indicative of status information related to the portable power panel.

In addition to the foregoing, a second DC to DC convertor converts the second DC voltage provided by the battery on the vehicle to a fourth DC voltage. The fourth DC voltage provides power to a distribution center on the vehicle. In examples, the second DC voltage is 48 volts and the fourth DC voltage is 12 volts. The third voltage is one of 110 volts and 220 volts.

In accordance with another example aspect of the invention, the portable power panel further includes an integrated cooling system configured to cool the portable power panel when in the coupled position or decoupled position. A third DC to DC convertor converts solar input energy to the second DC voltage. A step down voltage module can covert the second DC voltage to an accessory useable voltage. The first electrical connector can comprise a ground connection, a controller area network (CAN) connection, and a DC connection.

In addition to the foregoing, the first and second electrical connectors can be configured as one of a clamp and quick connect mechanism. In examples, the case can further include a handle extending therefrom.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there exists an opportunity for improvement in the art of portable power supplies. For example, in some instances an owner of an electrified vehicle may desire supplemental power for various auxiliary devices away from the vehicle such as lights, phones, cameras, watches, drones and any device that requires power. In other examples an owner of an electrified vehicle may be in a location where electrical power is unavailable such as in rural areas and/or during camping. A user may wish to provide electrical power to various devices such as, but not limited to, coolers, induction cookers, laptop computers, stereos, speakers, televisions, and projectors.

The present disclosure provides a detachable portable power panel that leverages the architecture of the electrified vehicle. As will be described herein, the portable power panel is chargeable during a typical electric vehicle recharging event Additionally or alternatively, the portable power panel can be charged by the high voltage battery system of the vehicle. For example, the portable power panel is charged using high voltage when connected to the vehicle in all propulsion enabled states. The portable power panel disclosed herein can be easily decoupled and removed from the vehicle and taken to whatever location the user desires a power source. Similarly, when the user is done using the portable power panel, it is easily reconnected to a dock in the vehicle (such as within a forward cargo area) where it can be recharged and available for any subsequent use.

It is appreciated that while the portable power panel is particularly useful while in remote areas where electricity is not readily available, the portable power panel can also be used where electricity is available but otherwise inconvenient or expensive to connect with. In one example, the portable power panel can be used for supplying power to food stations (e.g., food trucks) that are typically powered with gas and diesel engines that are associated with emissions, noise and other unfavorable characteristics that are undesirable in the food environment. As discussed herein, the portable power pack can be purposed for vehicle integration and vehicle uses as a primary function but also portability so the user can take the portable power pack to whatever location power is desired.

Figure 1:
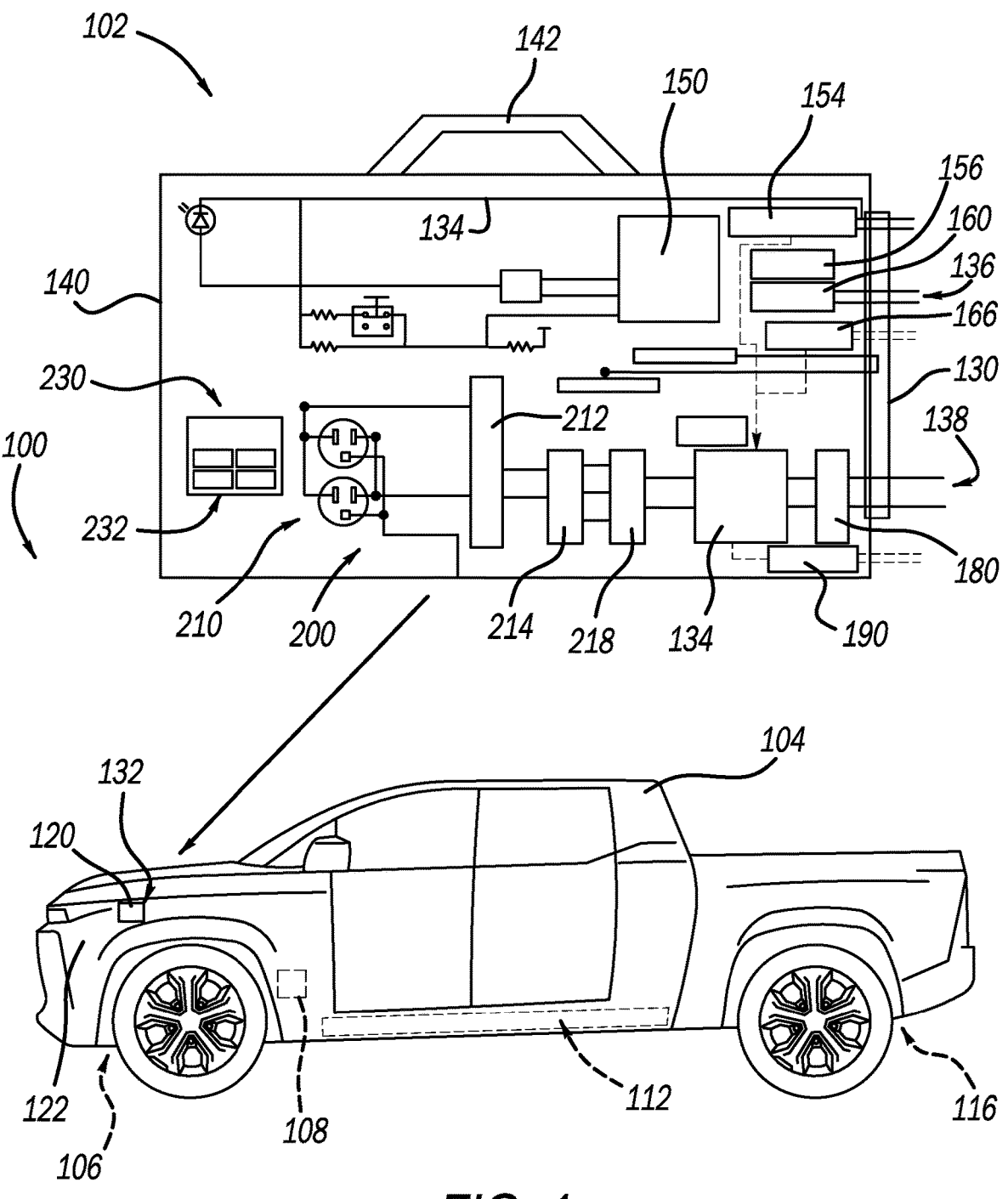
FIG. 1 is a partial schematic representation of a vehicle system that incorporates a portable power panel according to the principles of the present disclosure.

Referring now to FIG. 1, a partial schematic representation of a vehicle system 100 that incorporates a portable power panel 102 according to examples of the present disclosure is shown. The portable power panel 102 is detachable from a vehicle 104 and therefore portable. The vehicle system 100 generally includes an electrified powertrain 106 comprising one or more electric motors 108. The electric motor(s) 108 are powered by a high voltage battery system 112 (e.g., a 16 kilowatt-hour (kWh) lithium-ion battery pack) and generate drive torque that is transferred to a driveline 116 of the vehicle 100.

As will be described herein, the portable power panel 102 is selectively connected to a dock 120 arranged on the vehicle 104. In the example shown, the dock 120 is provided in a front storage compartment 122 of the vehicle 104. It will be appreciated however that the dock 120 can be arranged elsewhere on the vehicle 104. In the example shown, the portable power panel 102 has a first electrical connector 130 that is selectively electrically coupled to a complementary second electrical connector 132 at the dock 120. In examples, the first electrical connector 130 can be a single connector that includes all of a ground connection 134, a controller area network (CAN) high connection, a CAN low connection 136, and a DC−, DC+ connection 138. The first and second electrical connectors 130 and 132 can be configured to connect as a clamp or other quick connect mechanism (that opens/closes) conveying feedback to the user of a successful electrical connection.

The portable power panel 102 houses a battery 134. The portable power panel 102 can be configured to provide 400 W at 1 kW/hr. Other configurations are contemplated. The portable power panel 102 is easily movable from the dock 120 of the vehicle 104. The portable power panel 102 is of a weight that a user can successfully maneuver. In examples, the power panel 102 can be about 5-7 kilograms. The battery 134 according to the example shown is configured as a 48 volt battery (1 kilowatt-hour) although other voltages are contemplated. The portable power panel 102 generally comprises a housing or case 140 having a handle 142 extending proud therefrom. The handle 142 provides easy maneuvering of the portable power panel 102 to and from the dock 120. The portable power panel 102 includes a controller 150, a power supply and monitoring unit 154, a Bluetooth transceiver 156, a controller area network (CAN) transceiver 160 and a jump starter 166. The controller 150, power supply and monitoring unit 154 and Bluetooth transceiver 156 can cooperate to provide a user with status information regarding the portable power panel 102. In examples, a user's smart device can wirelessly communicate with the portable power panel 102 to convey charge status and other operational parameters of the battery 134 and of the portable power panel 102 as a whole.

Figure 2:
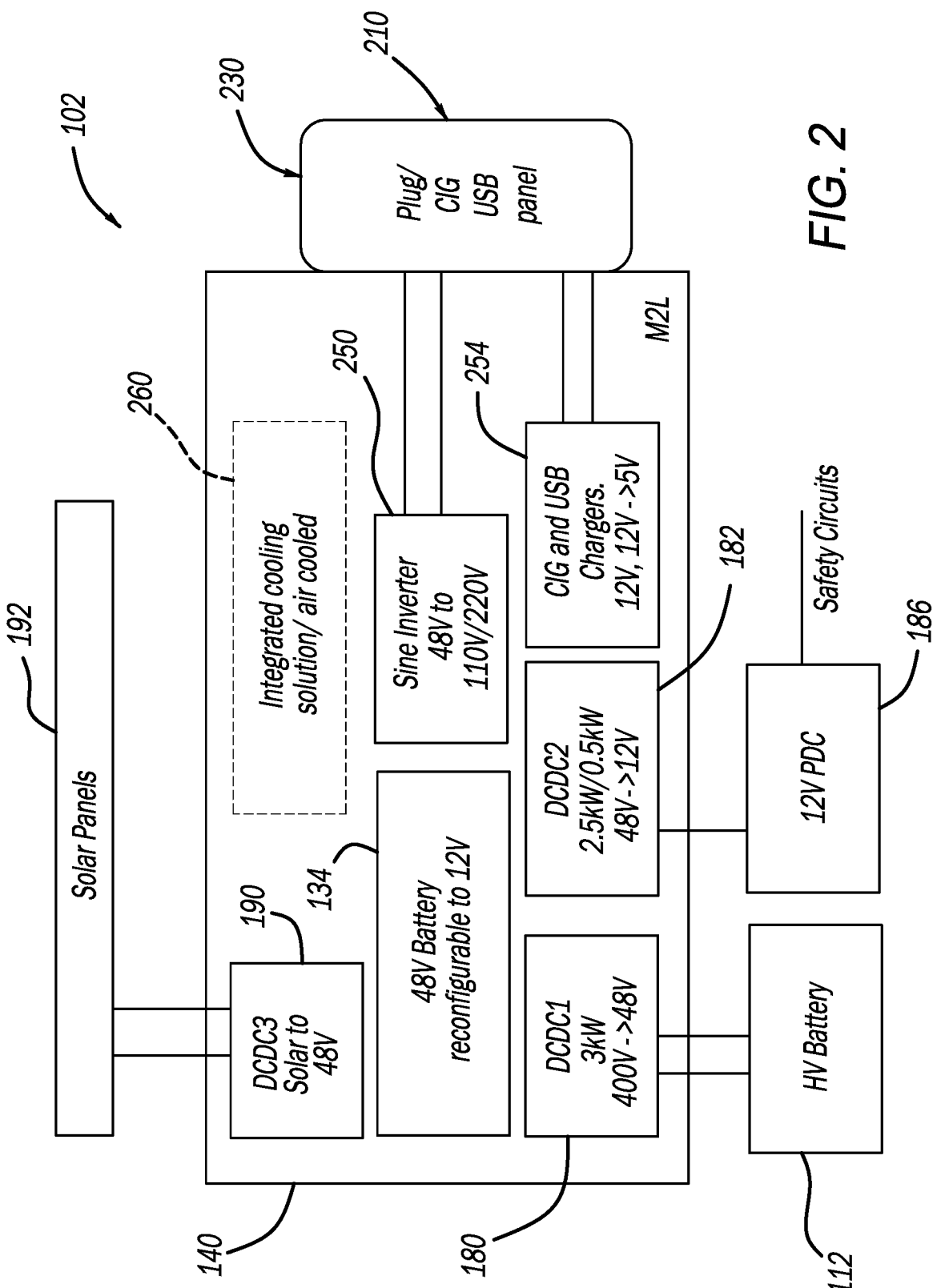
FIG. 2 is a schematic diagram of a portable power panel of FIG. 1 according to another example of the present disclosure.

With additional reference now to FIG. 2, additional features of the portable power panel 102 will be described. A first DC to DC convertor 180 is provided in the case 140. In examples, the first DC to DC convertor 180 can provide a step down voltage from 400 volts (from the high voltage battery 112) to 48 volts (to the battery 134). In examples, the DC to DC convertor 180 can provide 3 kW although other outputs are contemplated.

A second DC to DC convertor 182 is provided in the case 140. The second DC to DC convertor 182 provides a voltage output to a 12 volt power distribution center 186. The 12 volt power distribution center 186 is provided on the vehicle 104. In examples, the 12 volt power distribution center 186 can manage various electrical systems on the vehicle 104. In other examples, the 12 volt power distribution center 186 can additionally or alternatively power a start/stop system. It is contemplated that the 12 volt power distribution center 186 can take the place of a conventional 12 volt battery that would be housed within the vehicle 104. In other words, the sole 12 voltage source used for the vehicle 104 can be provided by the 48 voltage battery 134 within the portable power panel 102. Such a configuration can provide cost savings as well as providing the flexibility of portability.

A third DC to DC convertor 190 can convert solar input energy from solar panels 192 (FIG. 2) to 48 volts to charge the battery 134. An alternating current (A/C) circuit 200 (FIG. 1) can be electrically coupled to the battery 134. The A/C circuit 200 can generally include an A/C outlet 210, a fault monitoring and protection module 212, a filter 214 and invertors 218. A universal serial bus (USB) panel 230 is provided on the portable power panel 102. The USB panel 230 is powered by the battery 134 and includes a plurality of USB outlets collectively identified at 232. A sine inverter 250 can be configured to transition the 48 volt output of the battery 134 to an A/C voltage such as 110 volt or 220 volt at the A/C outlet 210. A step down voltage module 254 can drop usable voltage for the USB panel 230 to a useable voltage such as 5 volts. In examples, the step down voltage module 254 can additionally provide voltage to other accessories such as, but not limited to, a cigarette (CIG) lighter. An integrated cooling system 260 can be configured on the case 140. In examples, the integrated cooling system 260 can include one or more fans that operate to cool the case 140, as needed, such as while docked at the dock 120 in the front storage compartment 122 of the vehicle 104. In other examples, the cooling system 260 can operate to cool the case when undocked.

Figure 3:
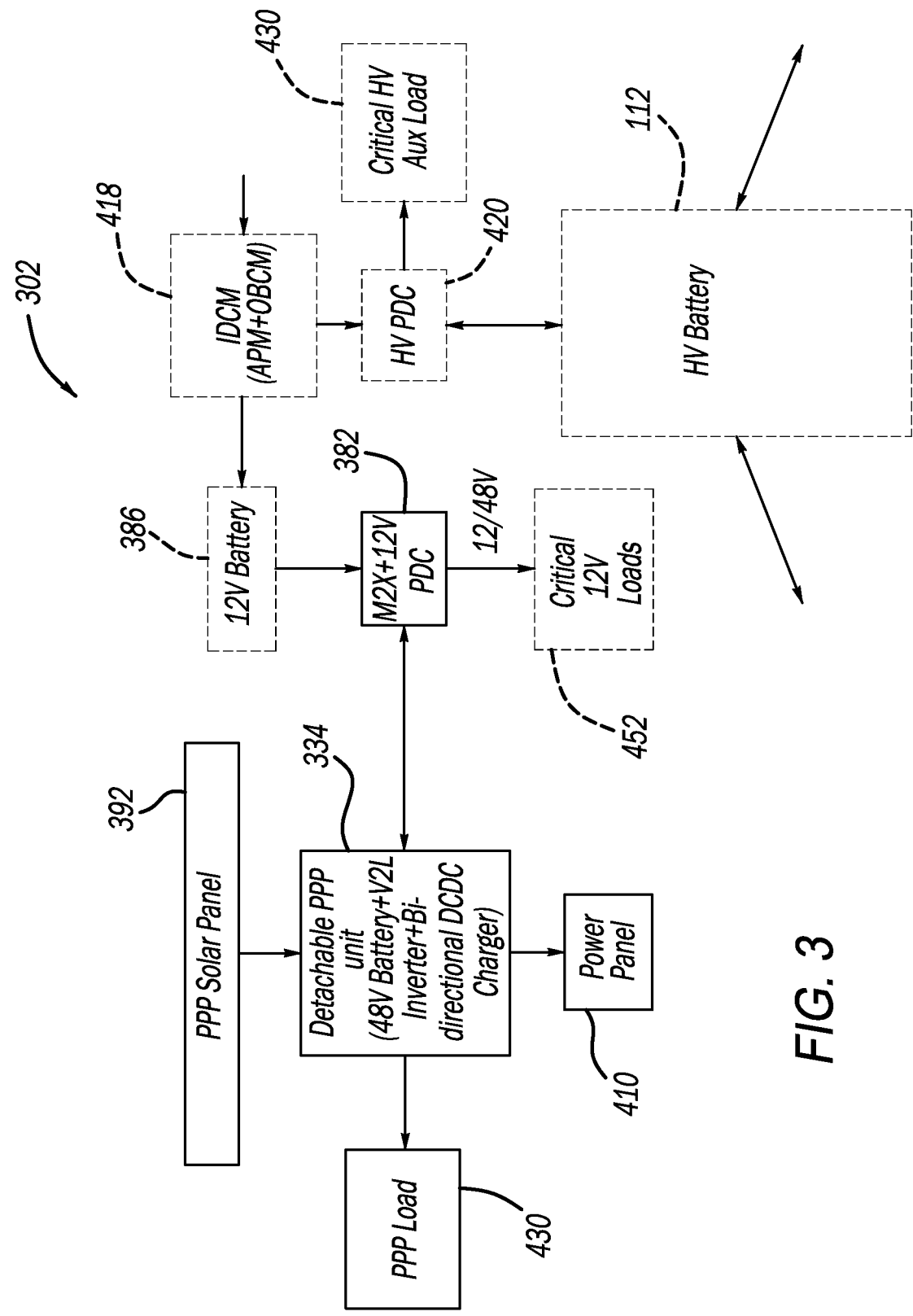
FIG. 3 is a schematic diagram of a portable power panel of FIG. 1 configured to accommodate various and functional and safety loads for 48 voltage according to another example of the present disclosure.

Turning now to FIG. 3, a portable power panel 302 configured according to additional features of the present disclosure will be described. Unless described differently, the portable power panel 302 can be configured similarly to the portable power panel 102. In this regard, like components increased by 200 have been denoted in FIG. 3 to represent like components described above with respect to the portable power panel 102. For reference, the components represented schematically in dashed line represents components generally housed on the vehicle 104 whereas the components represented schematically in solid line represents components provided on (or connectable to) the portable power panel 302.

The portable power panel 302 is configured to accommodate various functional and safety loads for 48 voltage. BEV are becoming increasingly reliant on high amounts of energy and have critical loads associated with auxiliary systems 430 including, but not limited to, various 48 volt loads, brake assist module, adaptive suspensions, steering, high voltage battery, vehicle dynamic control module (VDCM), battery coolant heater, advanced driver assistance systems (ADAS), park lock systems. The portable power panel 302 can be particularly useful in automated driving equipped vehicles having automotive safety integrity level (ASIL) classifications. The portable power panel 302 can incorporate an integrated charging module 418 that can operate as an integrated dual charging module (IDCM) that converts high voltage to low voltage. A high voltage power distribution center 420 is electrically connected between the integrated charging module 410 and the high voltage battery 112. The portable power panel 302 can be configured to also support critical 12 voltage loads 452.

Figures 4, 5:
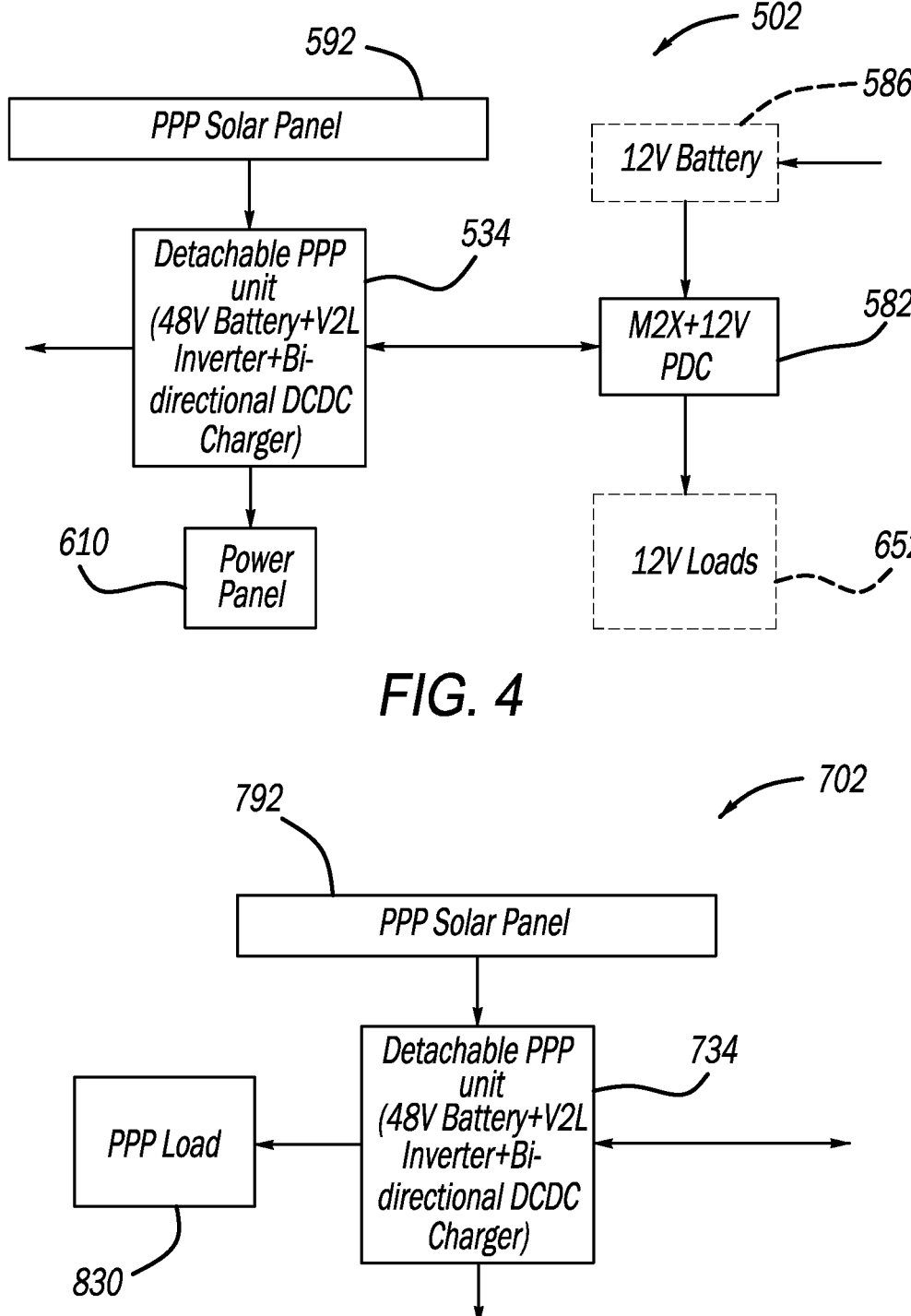
FIG. 4 is a schematic diagram of a portable power panel of FIG. 1 configured to accommodate passive vehicle load management according to another example of the present disclosure.
FIG. 5 is a schematic diagram of a portable power panel of FIG. 1 configured according to another example of the present disclosure.

Turning now to FIG. 4, a schematic diagram of a portable power panel 502 configured to accommodate passive vehicle load management according to another example of the present disclosure is shown. Unless described otherwise, the portable power panel 502 can be configured similarly to the portable power panel 102. In this regard, like components increased by 400 have been denoted in FIG. 4 to represent like components described above with respect to the portable power panel 102. The portable power panel 502 can leverage the solar panel 592 to manage 12 volt or 48 volt loads 652 in the vehicle cabin as well as to charge the battery 534. It is contemplated that a solar panel 592 can be provided on the vehicle 104 such as on a roof, cargo bed, hood or other area for capturing sunlight. In examples, the solar panel 592 can be configured to constantly capture sunlight such as when the vehicle is at rest or moving. The solar panel 592 can supply adequate charging power to the battery 534 to power the 12 volt (or 48 volt) loads of the vehicle. The high voltage battery 112 (FIG. 1) could be dedicated to only provide energy for vehicle propulsion (e.g., to the motor(s) 108). In this regard, the high voltage battery 112 can be the primary support while the solar panel 592 can provide the secondary support.

Turning now to FIG. 5, a schematic diagram of a portable power panel 702 configured according to another example of the present disclosure is shown. Unless described otherwise, the portable power panel 702 can be configured similarly to the portable power panel 102. In this regard, like components increased by 600 have been denoted in FIG. 5 to represent like components described above with respect to the portable power panel 102. The portable power panel 702 can leverage the solar panel 792 to charge the battery 734. As with the portable power panel 102, the portable power panel 702 can power a load 830 such as a 48 volt load, and/or a load associated with a USB panel and/or a power panel 810 that may include A/C outlets.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A portable power panel for a vehicle, the portable power panel comprising:
   a case having a first electrical connector extending therefrom, the case comprising:
      a first DC to DC convertor that converts a first DC voltage provided by a high voltage battery on the vehicle to a second DC voltage;
      a battery that produces the second DC voltage;
      an inverter that inverts the second DC voltage into a third voltage as an alternating current;
      an alternating current plug configured to supply the third voltage to an accessory plugged into the alternating current plug; and
   wherein the case is configured to be selectively and alternatively moved between a (i) coupled position wherein the first electrical connector is electrically coupled to a complementary second electrical connector provided at a dock in the vehicle, and a (ii) decoupled position wherein the first and second electrical connectors are disconnected and the case is moveable providing portable power away from the vehicle.

2. The portable power panel of claim 1 wherein the case further comprises:
   a universal serial bus (USB) panel powered by the battery.

3. The portable power panel of claim 2, further comprising:
   a power supply and monitoring unit that monitors operating parameters of the battery;
   a controller that receives the operating parameters from the battery; and
   a transceiver configured to wirelessly communicate operating parameters indicative of status information related to the portable power panel.

4. The portable power panel of claim 3, further comprising:
   a second DC to DC convertor that converts the second DC voltage provided by the battery on the vehicle to a fourth DC voltage, the fourth DC voltage providing power to a distribution center on the vehicle.

5. The portable power panel of claim 4 wherein the second DC voltage is 48 volts and the fourth DC voltage is 12 volts.

6. The portable power panel of claim 1 wherein the first DC voltage is 400 volts and the second DC voltage is 48 volts.

7. The portable power panel of claim 6 wherein the third voltage is one of 110 volts and 220 volts.

8. The portable power panel of claim 1, further comprising an integrated cooling system configured to cool the portable power panel when in the coupled position.

9. The portable power panel of claim 4, further comprising:
   a third DC to DC convertor that converts solar input energy to the second DC voltage.

10. The portable power panel of claim 9, further comprising:

a step down voltage module that converts the second DC voltage to an accessory useable voltage.

11. The portable power panel of claim 1, wherein the first electrical connector comprises:

a ground connection;

a controller area network (CAN) connection; and a DC connection.

12. The portable power panel of claim 11, wherein the first and second electrical connectors are configured as one of a clamp and quick connect mechanism.

13. The portable power panel of claim 1, wherein the case further includes a handle extending therefrom.

14. A portable power panel for a vehicle, the portable power panel comprising:

a portable housing having a handle extending therefrom, the portable housing having a first electrical connector thereon, the portable housing comprising:

a first DC to DC convertor that converts 400 volts DC provided by a high voltage battery on the vehicle to 48 volts;

a battery electrically coupled to the first DC to DC convertor and that produces 48 volts;

a second DC to DC convertor that converts the 48 volts to 12 volts at a distribution center on the vehicle;

an inverter that inverts 48 volts DC into one of 110 volts and 220 volts as an alternating current;

an alternating current plug configured to supply the alternating current;

a third DC to DC convertor that converts solar input energy from a solar panel to the 48 volts; and wherein the portable housing is configured to be selectively and alternatively moved between a (i) coupled position wherein the first electrical connector is electrically coupled to a complementary second electrical connector provided at a dock in the vehicle, and a (ii) decoupled position wherein the first and second electrical connectors are disconnected and the portable housing is moveable providing portable power away from the vehicle.

15. The portable power panel of claim 14, further comprising an integrated cooling system configured to cool the portable power panel when in the coupled position.

16. The portable power panel of claim 14, further comprising an integrated cooling system configured to cool the portable power panel when in the decoupled position.

17. The portable power panel of claim 14 wherein the first electrical connector comprises:

a ground connection;

a controller area network (CAN) connection; and a DC connection.

18. The portable power panel of claim 14 wherein the first and second electrical connectors are configured as one of a clamp and quick connect mechanism.

19. The portable power panel of claim 14 wherein the portable housing further includes a handle extending therefrom.

\* \* \* \* \*